(12) United States Patent
Guo et al.

(10) Patent No.: US 12,467,927 B2
(45) Date of Patent: Nov. 11, 2025

(54) FLUORESCENCE RESONANCE ENERGY TRANSFER (FRET) NANOPROBE AND PREPARATION METHOD AND USE THEREOF

(71) Applicant: QILU UNIVERSITY OF TECHNOLOGY, Shandong (CN)

(72) Inventors: Yingshu Guo, Shandong (CN); Xiaofei Zheng, Shandong (CN)

(73) Assignee: QILU UNIVERSITY OF TECHNOLOGY, Jinan (CN)

( * ) Notice: Subject to any disclaimer, the term of this patent is extended or adjusted under 35 U.S.C. 154(b) by 0 days.

(21) Appl. No.: 17/905,226

(22) PCT Filed: May 25, 2022

(86) PCT No.: PCT/CN2022/094811
§ 371 (c)(1),
(2) Date: Aug. 29, 2022

(87) PCT Pub. No.: WO2023/173583
PCT Pub. Date: Sep. 21, 2023

(65) Prior Publication Data
US 2024/0003885 A1 Jan. 4, 2024

(30) Foreign Application Priority Data
Mar. 18, 2022 (CN) .......................... 202210270080.7

(51) Int. Cl.
*G01N 33/573* (2006.01)
*B82Y 15/00* (2011.01)
*G01N 33/533* (2006.01)

(52) U.S. Cl.
CPC ............ *G01N 33/573* (2013.01); *B82Y 15/00* (2013.01); *G01N 33/533* (2013.01)

(58) Field of Classification Search
None
See application file for complete search history.

*Primary Examiner* — Jeffrey D Washville
(74) *Attorney, Agent, or Firm* — Welsh Flaxman & Gitler LLC

(57) ABSTRACT

The present disclosure provides a fluorescence resonance energy transfer (FRET) nanoprobe and a preparation method and use thereof, and belongs to the technical field of targeted nanomaterials. The FRET nanoprobe includes a loading component and an encapsulating component that encapsulates the loading component, where the loading component includes a carrier and DOX coated in the carrier, and the carrier is a carboxyl-modified hollow mesoporous silica nanoparticle (HMSN); and the encapsulating component includes an RVRR peptide and PAMAM/TPE. In the present disclosure, based on condensation properties of a carboxyl group of the carboxyl-modified HMSN, the RVRR peptide and the small-molecule polymer PAMAM/TPE are encapsulated on an outer surface of the HMSN by a reaction of the RVRR peptide that is specifically responsive to Furin and an amino group modified on a surface of the PAMAM/TPE with the carboxyl group on the surface of the HMSN. Therefore, the DOX is effectively encapsulated.

5 Claims, 9 Drawing Sheets

FLUORESCENCE RESONANCE ENERGY TRANSFER (FRET) NANOPROBE AND PREPARATION METHOD AND USE THEREOF

CROSS REFERENCE TO RELATED APPLICATION

The present application claims priority to the Chinese Patent Application No. 202210270080.7, filed to the China National Intellectual Property Administration (CNIPA) on Mar. 18, 2022 and entitled "FLUORESCENCE RESONANCE ENERGY TRANSFER (FRET) NANOPROBE AND PREPARATION METHOD AND USE THEREOF", all content of which is incorporated by reference herein in its entirety.

TECHNICAL FIELD

The present disclosure belongs to the technical field of targeted nanomaterials, and in particular relates to a fluorescence resonance energy transfer (FRET) nanoprobe and a preparation method and use thereof.

BACKGROUND ART

Fluorescent biosensors are important tools for analyzing and detecting biomolecules in living cells, and many fluorescent probes have been developed for biological detection. However, most fluorophores have very low solubility in aqueous solutions. Although many organic dyes with a fluorescent "on/off" effect are designed in the ionic form to increase their solubility in aqueous solutions, these dyes are still prone to aggregation-caused quenching (ACQ). In the early 2000s, researchers discovered that aggregation-induced emission (AIE) and the ACQ work in opposite ways. When AIE-based fluorescent molecular clusters are well dispersed, the dynamic rotation and vibration of intramolecular motion may reduce the excitation energy, thereby reducing fluorescence intensity. When the AIE-based fluorescent molecular clusters aggregate, the intramolecular motion is restricted, preventing dissipation of the excitation energy, thereby increasing the fluorescence intensity. Existing studies have demonstrated the feasibility of exhibiting a great potential in biomedical applications such as intracellular imaging and drug delivery by a FRET pair composed of AIE molecules and doxorubicin (DOX) ([1] Tiantian Wang, Qichun Wei, Zhentao Zhang, Jianqing Gao et. al, AIE/FRET-based versatile PEG-Pep-TPE/DOX nanoparticles for cancer therapy and real-time drug release monitoring, *Biomater. Sci.*, 2020, 8, 118-124. [2] Xiongqi Han, De-E Liu, Qixian Chen, Hui Gao et. al, Aggregation-Induced-Emissive Molecule Incorporated into Polymeric Nanoparticulate as FRET Donor for Observing Doxorubicin Delivery, *ACS Appl. Mater. Interfaces,* 2015, 7, 23760-23766).

In the current studies, with the release of DOX in tumor cells, TPE/DOX is separated and the FRET disappears. Correlation analysis can only be conducted through attenuation of FRET signals, with limitations.

SUMMARY

In view of this, an objective of the present disclosure is to provide a FRET nanoprobe and a preparation method and use thereof. In the present disclosure, a process of intracellular FRET from scratch is realized by a reverse method through intracellular self-assembly, and a new strategy is provided for quantitative detection of intracellular Furin.

The present disclosure provides a FRET nanoprobe, including a loading component and an encapsulating component that encapsulates the loading component, where the loading component includes a carrier and DOX coated in the carrier, and the carrier is carboxyl-modified hollow mesoporous silica nanoparticle (HMSN); and the encapsulating component includes an RVRR peptide and PAMAM/TPE.

In some embodiments, the carboxyl-modified HMSN and the DOX have a mass ratio of (1-2):(1-2).

The present disclosure further provides a preparation method of the FRET nanoprobe, including the following steps:
1) mixing a carboxyl-modified HMSN solution and a DOX solution to obtain an HMSN/DOX solution; and
2) mixing the HMSN/DOX solution, the RVRR peptide, and the PAMAM/TPE to obtain the FRET nanoprobe.

In some embodiments, where in step 1) and step 2), the mixing can be conducted independently at 20° C. to 30° C. for 20 h to 24 h in the dark.

The present disclosure further provides use of the FRET nanoprobe or a FRET nanoprobe prepared by the preparation method in detection of Furin.

In some embodiments, the Furin includes intracellular Furin.

In some embodiments, the detection includes quantitative detection.

The present disclosure further provides use of the FRET nanoprobe or a FRET nanoprobe prepared by the preparation method for preparing an anti-tumor drug.

In some embodiments, the anti-tumor drug includes a targeted anti-tumor drug.

The present disclosure provides a FRET nanoprobe, including a loading component and an encapsulating component that encapsulates the loading component, where the loading component includes a carrier and DOX coated in the carrier, and the carrier is carboxyl-modified HMSN; and the encapsulating component includes an RVRR peptide and PAMAM/TPE. In the present disclosure, based on condensation properties of a carboxyl group of the carboxyl-modified HMSN, the RVRR peptide and the small-molecule polymer PAMAM/TPE are encapsulated on the outer surface of the HMSN by reactions of the RVRR peptide that is specifically responsive to Furin and an amino group modified on a surface of the PAMAM/TPE with the carboxyl group on the surface of the HMSN to coat the DOX effectively. When the FRET nanoprobe enters the tumor cells, overexpressed Furin in the tumor cells can cut off the specific peptide sequence blocked at HMSN nanopores, such that the DOX inside the HMSN can be released. Due to the adhesion of PAMAM/TPE, the PAMAM/TPE can hinder the rapid release of DOX, and the released DOX is tightly conjugated with the PAMAM/TPE encapsulated on an outer surface of the HMSN to form TPE/DOX, and the TPE/DOX can achieve a sensitive FRET fluorescence "on" effect. A specific process includes: TPE/DOX has unique fluorescence characteristics: a fluorescence emission spectrum of the TPE and an absorption spectrum of the DOX have obvious spectral overlap, resulting in a FRET effect. When an excitation light at 330 nm is absorbed by the TPE, the light emitted by the TPE excites DOX fluorescence emission simultaneously, thereby detecting a fluorescence signal of the DOX, namely a signal peak at 580 nm; then detecting the intracellular Furin quantitatively by the generated FRET fluorescence signal. As a tumor marker, Furin content can be used as a basis for tumor diagnosis; and early diagnosis of tumors can be realized by quantitative detection of the Furin in cells.

In previous researches, with the release of DOX in tumor cells, TPE/DOX is separated and the FRET disappears. Correlation analysis can only be conducted by attenuation of FRET signals. Different from a previously studied process of FRET from extracellular to intracellular, a process of intracellular FRET from scratch is realized by a reverse method through intracellular self-assembly, and a new strategy is provided for quantitative detection of intracellular Furin. The generation of intracellular FRET fluorescence signals can specifically analyze the content of overexpressed Furin in tumor cells, and can kill tumor cells with the continuous release of DOX.

DETAILED DESCRIPTION OF THE EMBODIMENTS

Figure 1:
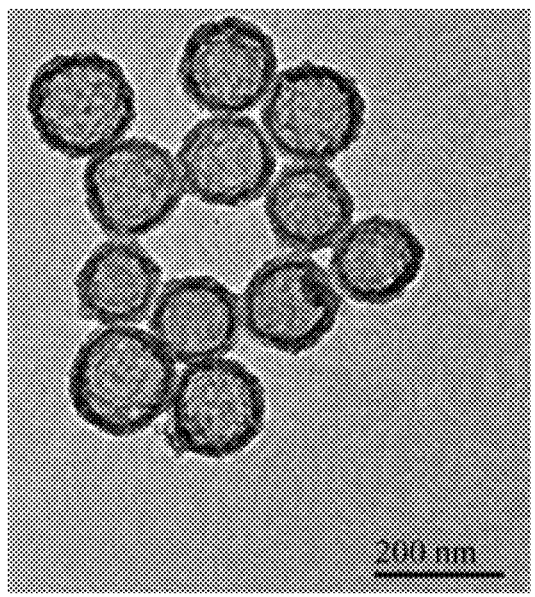
FIG. 1 shows a transmission electron microscope (TEM) image of HMSN.

The present disclosure provides a FRET nanoprobe, including a loading component and an encapsulating component that encapsulates the loading component, where the loading component includes a carrier and DOX coated in the carrier, and the carrier is carboxyl-modified HMSN; and the encapsulating component includes an RVRR peptide and PAMAM/TPE.

In some embodiments of the present disclosure, the FRET nanoprobe has a particle size of 150 nm to 190 nm, in some other embodiments, more preferably, particle size is 160 nm to 180 nm.

In some embodiments of the present disclosure, the loading component and the encapsulating component have a mass ratio of 1:2; the RVRR peptide and the PAMAM/TPE have a mass ratio of 1:2.

In some embodiments of the present disclosure, the carboxyl-modified HMSN and the DOX have a mass ratio of (1-2):(1-2), more preferably, the mass ratio is 1:1.

In the present disclosure, the carboxyl-modified HMSN can interact with other small molecules; the RVRR peptide and the amino group modified on the surface of the PAMAM/TPE react with the carboxyl group on the surface of the HMSN to encapsulate the RVRR peptide and the small molecule polymer PAMAM/TPE on the outer surface of the HMSN, to coat the DOX effectively. In addition, the PAMAM/TPE on the outer surface of the HMSN has a certain adhesion, and the dendritic structure thereof can jointly realize conjugation of the PAMAM/TPE and the DOX, thereby creating conditions for TPE/DOX to realize FRET.

In some embodiments of the present disclosure, the carboxyl-modified HMSN are modified with a carboxyl group on the surface of HMSN by TESPSA; the TESPSA is condensed with HMSN at a pH value of 1, and a generated acid anhydride group is converted into —COOH with an increase of the pH value (6 to 7) during washing with water; there is no special limitation on the method for modifying the carboxyl on the surface of HMSN by TESPSA, and conventional methods in the art can be used.

In the present disclosure, there is no special limitation on the method for preparing the HMSN, and conventional methods in the art can be used. In the specific embodiments of the present disclosure, the HMSN are synthesized by a template method.

In some embodiments of the present disclosure, the PAMAM/TPE is prepared by the following method:

mixing a TPE-COOH solution, an EDC solution, and an NHS solution to achieve activation of the carboxyl group; and mixing the activated TPE-COOH with a PAMAM solution to obtain the PAMAM/TPE. In some embodiments of the present disclosure, a solvent of the TPE-COOH solution is DMSO, and the TPE-COOH solution has a molar concentration of 10 mM; the EDC solution has a molar concentration of 0.5 mM; the NHS solution has a molar concentration of 0.5 mM; the activation is conducted at 25° C. for 30 min; the PAMAM solution has a concentration of 4 mg/mL; and the mixing is conducted at 25° C. for 12 h by shaking.

The present disclosure further provides a method for preparing the FRET nanoprobe, including the following steps:
1) mixing a carboxyl-modified HMSN solution and a DOX solution to obtain an HMSN/DOX solution; and
2) mixing the HMSN/DOX solution, the RVRR peptide, and the PAMAM/TPE to obtain the FRET nanoprobe.

In the present disclosure, the carboxyl-modified HMSN solution and the DOX solution are mixed to obtain the HMSN/DOX solution.

In some embodiments of the present disclosure, in the carboxyl-modified HMSN solution, the carboxyl-modified HMSN have a mass concentration of 2 mg/mL to 3 mg/mL, in some other embodiments, the mass concentration is 2.5 mg/mL. In some embodiments of the present disclosure, in the DOX solution, the DOX has a mass concentration of 2 mg/mL to 3 mg/mL, in some other embodiments, the mass concentration is 2.5 mg/mL. In some embodiments, the mixing is conducted at 20° C. to 30° C., in some other embodiments, at 25° C. for 20 h to 24 h in the dark.

In some embodiments of the present disclosure, the HMSN/DOX solution is further centrifuged to obtain a precipitation; after washing the precipitate with a PBS buffer, the washed precipitation is dispersed in the DMSO. In some embodiments, the centrifugation is conducted at preselected 10,000 rpm for 10 min; the PBS buffer has a pH value of 7.4 and a concentration of 10 mM; the washing is conducted 3 times.

In the present disclosure, after obtaining the HMSN/DOX solution, the HMSN/DOX solution, the RVRR peptide, and the PAMAM/TPE are mixed to obtain the FRET nanoprobe.

In some embodiments, the mixing is conducted at 20° C. to 30° C., in some other embodiments, at 25° C. for 20 h to 24 h in the dark.

The present disclosure further provides use of the FRET nanoprobe or a FRET nanoprobe prepared by the preparation method for preparing a Furin detection reagent.

In some embodiments of the present disclosure, the Furin includes intracellular Furin.

In some embodiments of the present disclosure, the detection includes quantitative detection. By fitting a standard curve, a quantitative relationship between the intensity of the fluorescent signal and the concentration of the Furin is obtained, that is, Y=0.396X+0.00952 (where Y represents a fluorescence intensity $I_2$ of DOX/a fluorescence intensity $I_1$ of TPE, X represents a concentration of the Furin, U/mL, R=0.998).

The present disclosure further provides use of the FRET nanoprobe or a FRET nanoprobe prepared by the preparation method for preparing an anti-tumor drug. The anti-tumor drug is DOX coated in the HMSN pores. The FRET nanoprobe can enter tumor cells through an ERP effect due to a suitable particle size.

In some embodiments of the present disclosure, the anti-tumor drug includes a targeted anti-tumor drug.

The technical solutions in the present disclosure are clearly and completely described below in conjunction with examples of the present disclosure.

Example 1

1.1. Reagents and Materials $NH_2$-PAMAM was purchased from Xi'an Ruixi Biological Technology Co., Ltd.; 1-(4-carboxyphenyl)-1,2,2-triphenylethylene (TPE-COOH) was purchased from Shanghai Dibao Biotechnology Co., Ltd.; 3-(triethoxysilyl)propylsuccinic anhydride (TESPSA), cetyltrimethyl ammonium bromide (CTAB), N-(3-dimethylaminopropyl)-N'-ethylcarbodiimide hydrochloride (EDC) and N-hydroxysuccinimide (NHS) were purchased from Shanghai Aladdin Biochemical Technology Co., Ltd.; KRVRRC polypeptide chain was synthesized by Sangon Biotech (Shanghai) Co., Ltd.; DOX hydrochloride was provided by Sangon Biotech (Shanghai) Co., Ltd.; Furin and Furin inhibitor were purchased from AmyJet Scientific (Hubei).

1.2. Instrument

Size and Zeta potential determinations were conducted on a Zetasizer Nano ZS (ZEN 3600, Malvern Instruments Ltd.). Transmission electron microscopy (TEM) images were determined by a transmission electron microscope (JEM-2100, JEOL). The fluorescence was measured by an F-4600 Fluorescence Spectrophotometer (Japan); the confocal fluorescence images of cells were obtained by a Nikon laser confocal microscope (Nikon, Japan).

1.3. Preparation of PAMAM/TPE

TPE-COOH (10 mM) was dissolved with DMSO; the obtained TPE-COOH solution was mixed with 10 μL of an EDC solution (0.5 mM) and 10 μL of an NHS solution (0.5 mM), and shaken at 25° C. for 30 min to activate the carboxyl group of TPE-COOH; the activated TPE-COOH was transferred to a centrifuge tube containing 4 mg of $mL^{-1}$ PAMAM and mixed evenly, and a reaction was conducted by shaking at 25° C. for 12 h.

1.4. Preparation of HMSN

Typically, silica ($sSiO_2$) was first synthesized by a Stober method. Briefly, 100 mL of ethanol and 8 mL of water were mixed with 4 mL of an ammonia solution (37% to 38%), then 3 mL of TEOS was added. After stirring for 6 h at 30° C., the $sSiO_2$ suspension was obtained. A mesoporous silica shell was packaged on a silica core by a surfactant-templated sol-gel method, and a core/shell structure was formed using a surfactant CTAB as a template; a prepared $sSiO_2$ suspension was poured into a solution containing 220 mL of water, 10 mL of ethanol, and 1200 mg of the CTAB, and a mixture was stirred for 30 min. 1.075 mL of the TEOS was added and the dispersion was stirred overnight. A precipitate was collected by centrifugation then redispersed in water to obtain $sSiO_2@mSiO_2$ core/shell nanoparticles. The HMSN were prepared by selective etching. The prepared $sSiO_2@mSiO_2$ core/shell nanoparticles were collected by centrifugation then redispersed in 150 mL of a $Na_2CO_3$ (0.4 M) aqueous solution, and a mixture was stirred at 50° C. for 2 h to remove the solid silica core. The CTAB was used as an additive to accelerate $sSiO_2$ etching and a stabilizer to protect silicates from alkaline etching. This $CTA^+$-promoted etching and redeposition forming was selective etching of $sSiO_2@mSiO_2$ using a $Na_2CO_3$ etch mechanism. To eliminate the potential toxic effect of cationic CTAB on cells, the CTAB in HMSN was removed by a HCl/ethanol mixture by sonication. After removing CTAB micelles in the mesoporous shell, the HMSN was obtained by repeated washing with concentrated HCl/ethanol (v/v=1:10) and water for 3 times.

1.5. Preparation of Carboxyl-Modified HMSN (HMSN/COOH)

To facilitate the interaction of HMSN with other small molecules, carboxyl modification was conducted on the surface of HMSN using TESPSA, the TESPSA could condense with HMSN at a lower pH value of 1. A resulted anhydride group was converted to —COOH with increasing pH (6 to 7) during washing with water. That is, 0.1 mL of the TESPSA was added to an HMSN suspension containing 50 mL of HCl (0.1 M), and the obtained mixture was stirred at 50° C. for 5 h. The resulted carboxyl-modified HMSN (denoted as HMSN, used for all experiments unless otherwise stated) were collected by centrifugation then washed 3 times with deionized water.

1.6. Preparation of DOX-Loaded HMSN (HMSN/DOX)

2.5 mg of mL$^{-1}$ HMSN was mixed with 2.5 mg of mL$^{-1}$ DOX in a PBS buffer (pH=7.4, 10 mM). The obtained mixture was stirred at room temperature in the dark for 24 h to ensure that the DOX was trapped in HMSN to a large extent. A obtained HMSN/DOX solution was centrifuged at 10,000 rpm for 10 min, and washed three times with the PBS buffer (pH=7.4, 10 mM), and the supernatant was discarded. The solution was dispersed in 1 mL of DMSO for further use.

1.7. Preparation of HMSN/DOX/RVRR/PAMAM/TPE Probe 1 mL of HMSN/DOX was dissolved in DMSO, then mixed with 10 µL of the EDC solution (0.5 mM) and 10 µL of the NHS solution (0.5 mM), and shaken at 25° C. for 30 min to complete activation. Then 2.5 mg of an RVRR peptide was added, and 500 µL of PAMAM/TPE was added to the reaction system at the same time. A mixture was stirred for 24 h in the dark at room temperature to facilitate conjugation of the peptide nanoscale encapsulation of the drug and the PAMAM/TPE. The mixture was washed three times with the PBS buffer, and the resulted HMSN/DOX/RVRR/PAMAM/TPE was collected by centrifugation at 10,000 g for 10 min, then resuspended in PBS (pH=7.4), and stored at 4° C.

2. RESULTS AND DISCUSSION 2.1. Basic Characterization of Materials

Figure 2:
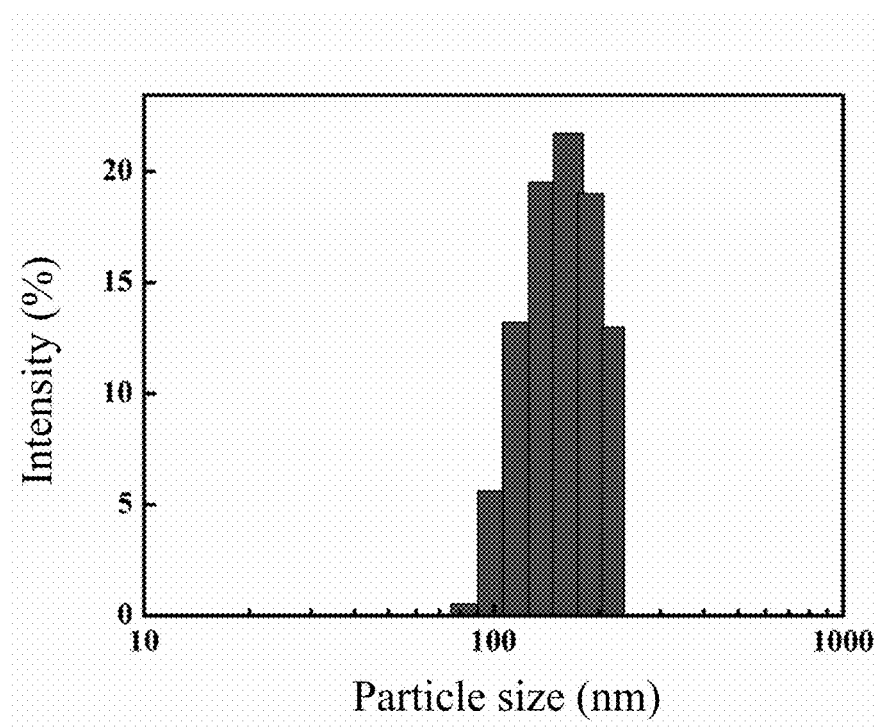
FIG. 2 shows a diagram of particle size distribution of the HMSN.
Figure 3:
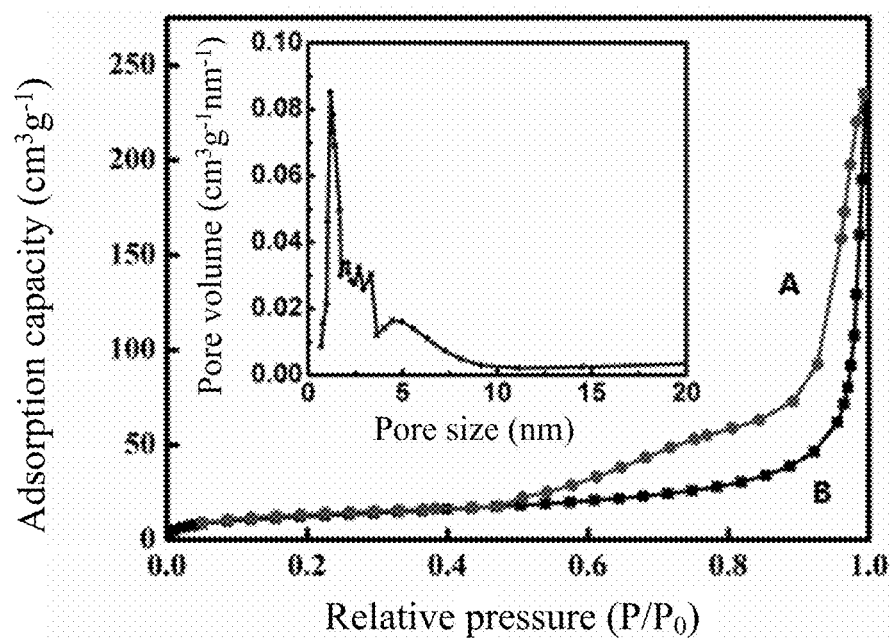
FIG. 3 shows a $N_2$ adsorption curve and a pore size analysis of the HMSN, where curve B and curve A represent nitrogen adsorption and desorption isotherms, respectively.
Figure 4:
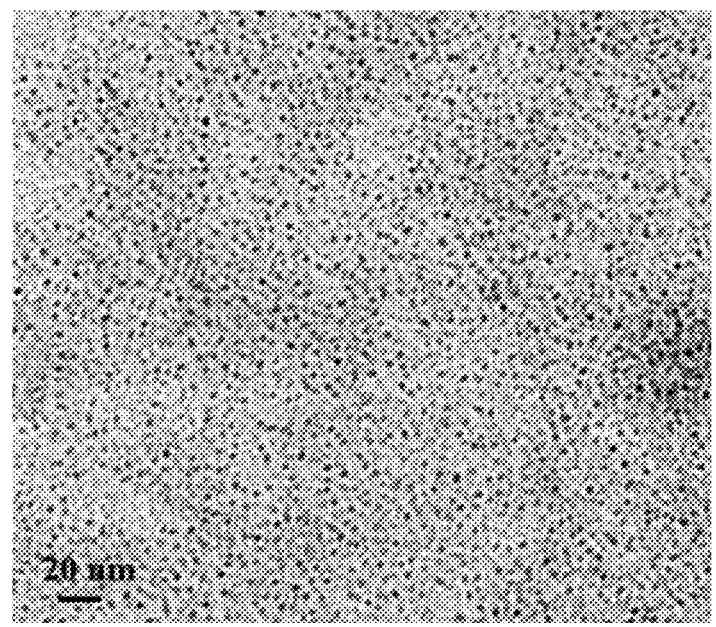
FIG. 4 shows a TEM image of PAMAM (G=1.5) nanoparticles.
Figure 5:
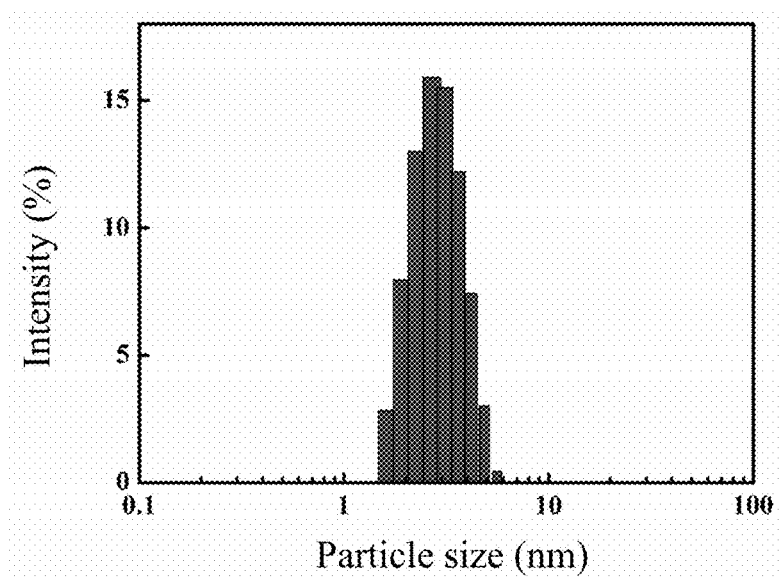
FIG. 5 shows a diagram of particle size distribution of the PAMAM (G=1.5) nanoparticles.
Figure 6:
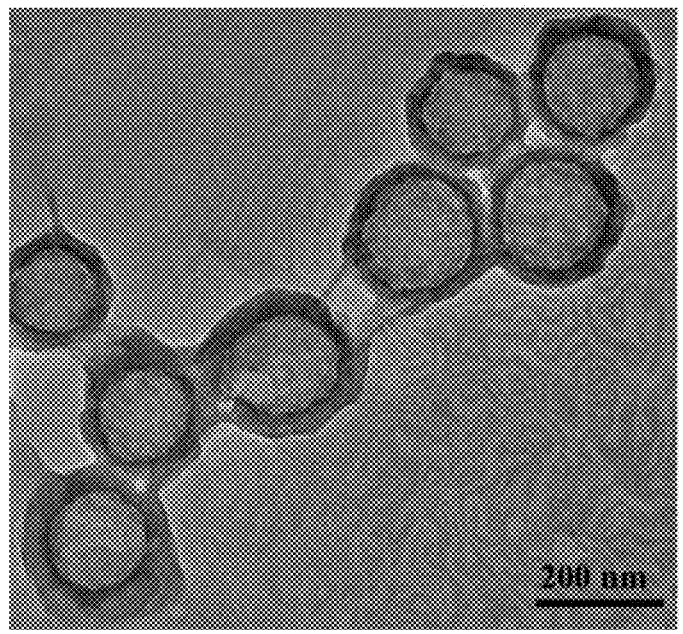
FIG. 6 shows a TEM image of an HMSN/DOX/RVRR/PAMAM/TPE nanoprobe.
Figure 7:
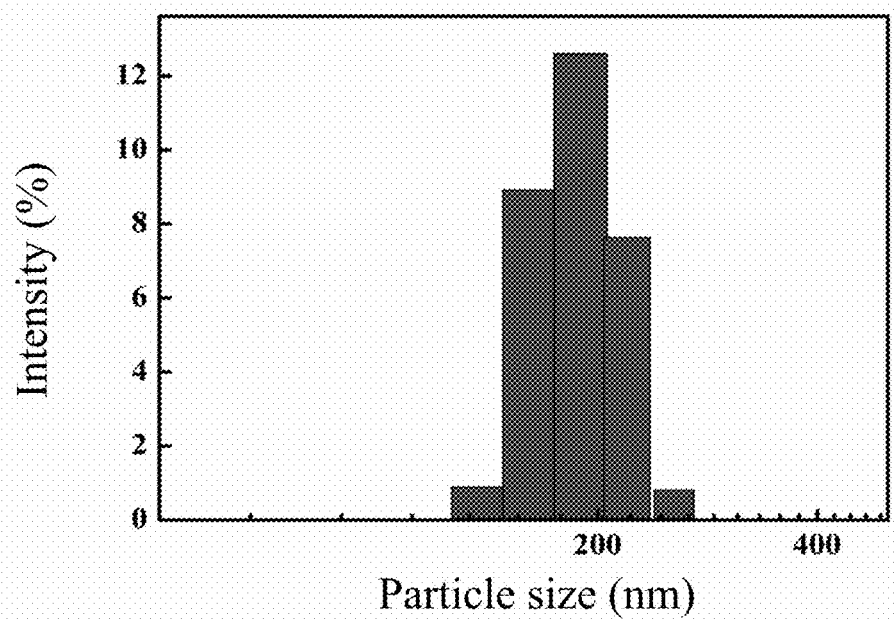
FIG. 7 shows particle size distribution of the HMSN/DOX/RVRR/PAMAM/TPE nanoprobe.
Figure 8:
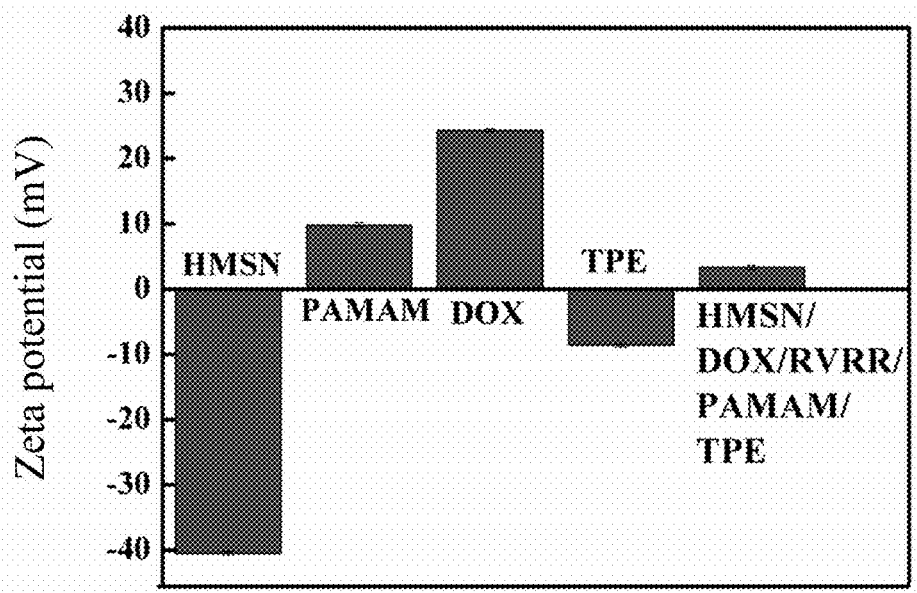
FIG. 8 shows Zeta potential diagrams of the HMSN, the PAMAM nanoparticles, DOX, TPE and the HMSN/DOX/RVRR/PAMAM/TPE.

The synthesized HMSN were characterized by TEM and dynamic light scattering (DLS). Through TEM analysis, it was observed that the resulted HMSN had a particle size of about 120 nm and a shell thickness of about 30 nm to 40 nm (FIG. 1). Meanwhile, the particle size distribution measured by DLS was mainly around 140 nm (FIG. 2). The experimental data was matched up with each other. In addition, nitrogen adsorption and desorption experiments were conducted on the HMSN, and the results showed that the pore size of them was about 2.5 nm (FIG. 3), which was similar to the particle size of CTAB micelles reported in the literature. To increase reactive sites of the HMSN, carboxyl modification was conducted on the surface of HMSN by TESPSA; a modified Zeta potential was shifted to a more negative potential, indicating that the carboxyl modification of HMSN was achieved. The particle size of PAMAM (G=1.5) dendrimer was characterized by TEM. As shown in FIG. 4, the PAMAM had a particle size of about 5 nm with desirable dispersibility. The particle size distribution measured by DLS was around 8 nm (FIG. 5). The PAMAM had a zeta potential of 9.83 mV due to presence of a large number of amino groups on the surface, while the zeta potentials of DOX and TPE-COOH were 24.3 mV and −8.6 mV, respectively (FIG. 8). Meanwhile, to prevent the early leakage of DOX, the DOX was encapsulated by the RVRR peptide and PAMAM/TPE. To verify the successful encapsulation of HMSN/DOX, TEM characterization was conducted. As shown in FIG. 6, it was clearly seen that there was a transparent thin layer structure with uniform thickness on the surface of HMSN, with a particle size of about 150 nm, indicating the synthesis of HMSN/DOX/RVRR/PAMAM/TPE probe was successful. Characterized by DLS and Zeta potential, the particle size distribution of the transparent thin layer structure was around 160 nm (FIG. 7), and a Zeta potential was 3.25 mV (FIG. 8). These results confirmed that RVRR/PAMAM/TPE has been successfully encapsulated on the surface of HMSN.

2.2. Feasibility Study

Figure 9:
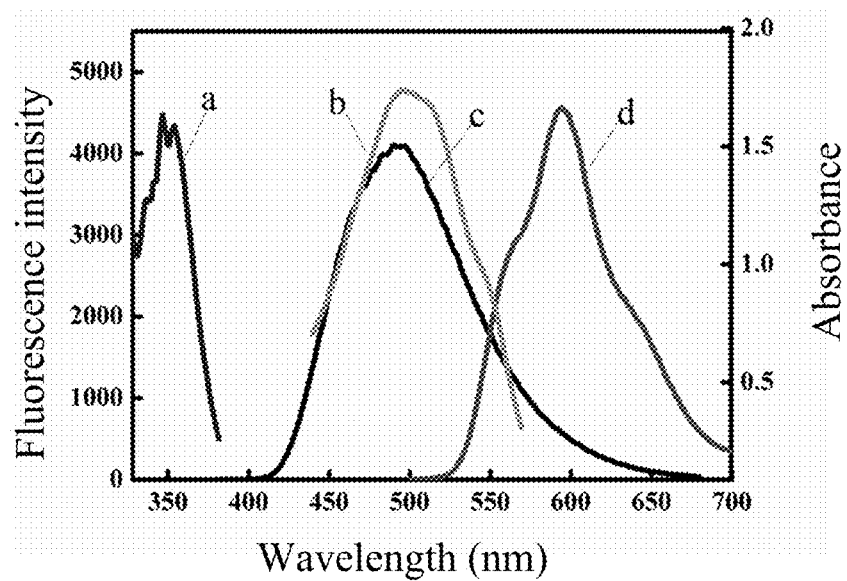
FIG. 9 shows absorption and emission spectra of PAMAM-TPE and DOX, where a: PAMAM/TPE (Abs), b: DOX (Abs), c: PAMAM/TPE (FL Intensity), and d: DOX (FL Intensity)

The feasibility of TPE/DOX for FRET was studied. The fluorescence experiments showed that a maximum emission wavelength of PAMAM/TPE molecule was located at 480 nm, which overlapped significantly with a maximum absorption wavelength of the DOX, indicating that TPE and DOX could form a FRET pair to achieve specific quantitative detection of Furin in cells (FIG. 9).

Figure 10:
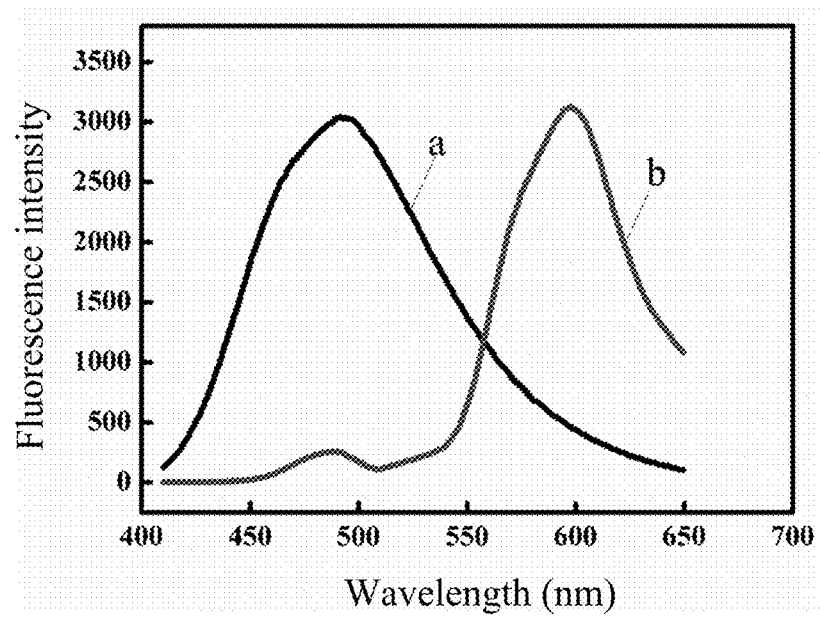
FIG. 10 shows fluorescence spectra of (a) PAMAM-TPE and (b) PAMAM-TPE-DOX at the same concentration (excitation at 330 nm)
Figure 11:
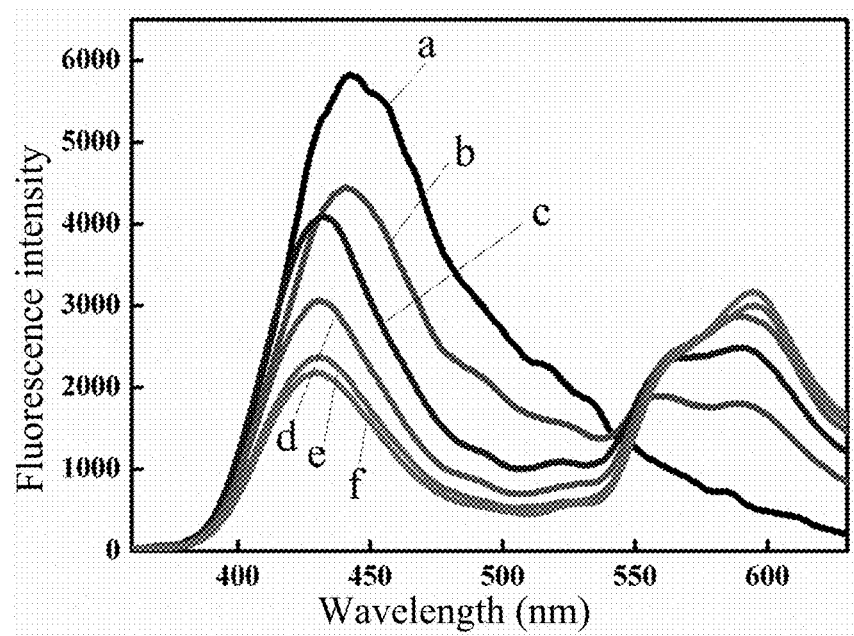
FIG. 11 shows fluorescence spectra of the HMSN/DOX/RVRR/PAMAM/TPE fluorescent probe at a pH value of 5.0 in the presence of 1.5 U/mL Furin at a specific time interval (where time of a to f are: 0 h, 0.5 h, 1 h, 1.5 h, 2 h, and 4 h)

The fluorescence spectra of PAMAM/TPE and PAMAM/TPE/DOX were compared under the excitation of 330 nm ultraviolet light. It was found that at 480 nm, the fluorescence emission intensity of PAMAM/TPE/DOX was much lower than that of PAMAM/TPE; however, at 580 nm and 600 nm, the fluorescence emission intensity of PAMAM/TPE/DOX was greatly enhanced (FIG. 10). This result indicated that FRET could occur between TPE and DOX. To further verify the FRET effect of HMSN/DOX/RVRR/PAMAM/TPE and simultaneously monitor the release of DOX molecule, pH/Furin-triggered peptide chain cleavage reaction was conducted to monitor the treatment of HMSN/DOX/RVRR/PAMAM/TPE at pH=5.0 and 1.5 U mL$^{-1}$ Furin and measure changes of fluorescence intensity at different time points. It was found that with the extension of time, the fluorescence intensity of TPE molecule gradually weakened, while the fluorescence intensity of DOX emitted at 580 nm and 600 nm was greatly enhanced, and then gradually became stable after 2 h (FIG. 11). This reflected that under the action of Furin, the cleavage of RVRR peptide triggered the release of DOX, the DOX was simultaneously trapped by PAMAM/TPE, resulting in the FRET effect between TPE and DOX, which enabled the qualitative analysis of Furin.

Figure 12:
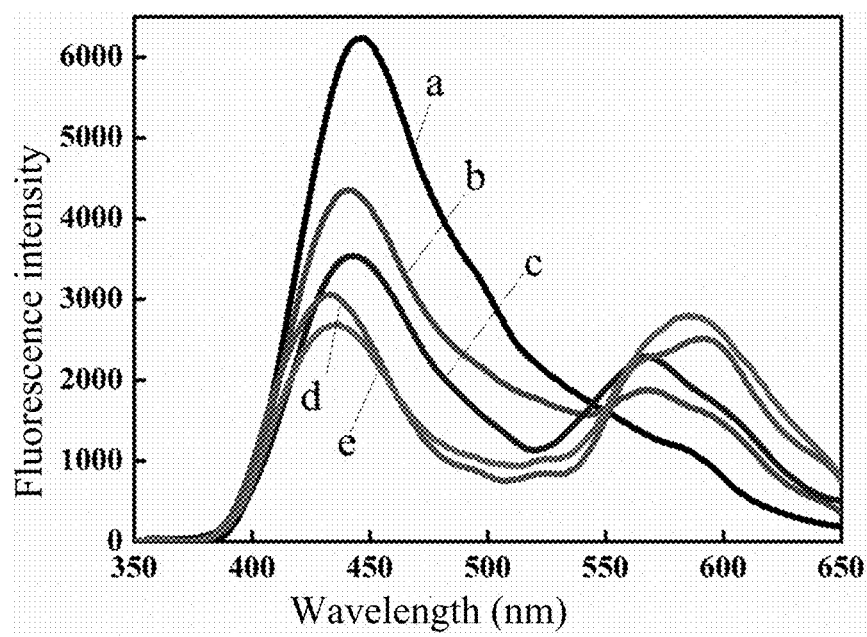
FIG. 12 shows fluorescence spectra of the HMSN/DOX/RVRR/PAMAM/TPE fluorescent probe co-incubated for 2 h at a pH value of 5.0 in the presence of different concentrations of Furin (where a to e are: 0 U/mL, 0.5 U/mL, 1 U/mL, 1.5 U/mL, and 2 U/mL)
Figure 13:
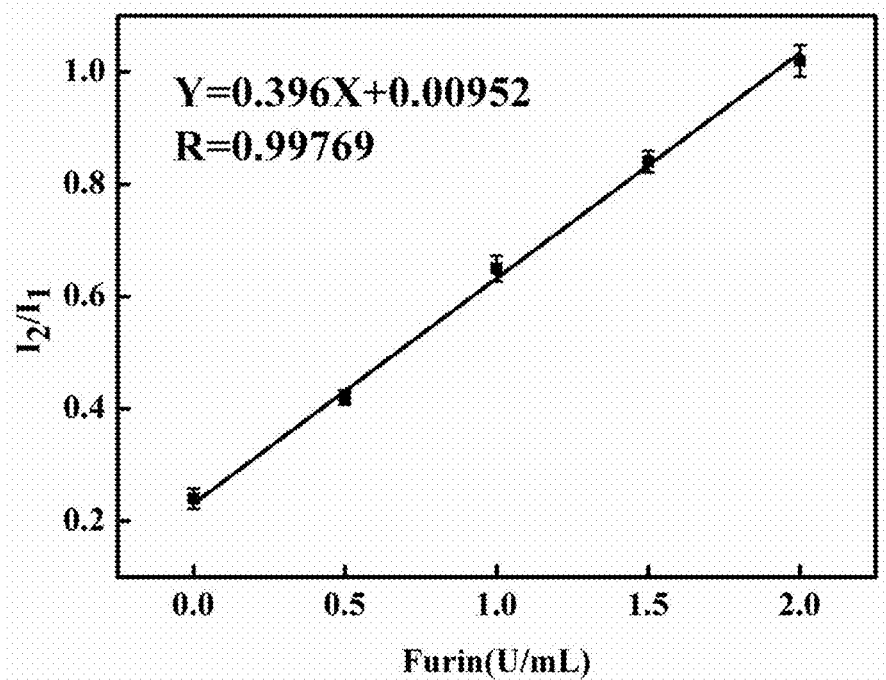
FIG. 13 shows a relationship between a fluorescence intensity ratio of the HMSN/DOX/RVRR/PAMAM/TPE fluorescent probe and the Furin concentration under Furin stimulation, where the RSD is 3.5%.

To study the quantitative detection ability of the method on Furin, Furin solutions with different concentrations were used as detection samples, and incubated solutions were subjected to fluorescence detection. FIG. 12 shows variation curves of the two fluorescence signals (the fluorescence intensity $I_1$ of TPE and the fluorescence intensity $I_2$ of DOX) after incubation with different concentrations of Furin (0, 0.5, 1, 1.5 and 2 U mL$^{-1}$). As shown in the figure, with the increase of Furin concentration, $I_1$ gradually decreased, while 12 increased accordingly, indicating that the production of FRET had a certain concentration dependence. Therefore, a fitting linear equation was Y=0.396X+0.00952 (where Y represented $I_2/I_1$, X represented Furin concentration, U mL$^{-1}$, R=0.998), where RSD was 3.5% (FIG. 13). The concentration of Furin in 1.0×10$^6$ MDA-MB-468 cells was 1.15 ng mL$^{-1}$ 0.08 ng mL$^{-1}$ by a working curve, which was consistent with the literature reports.

Figure 14:
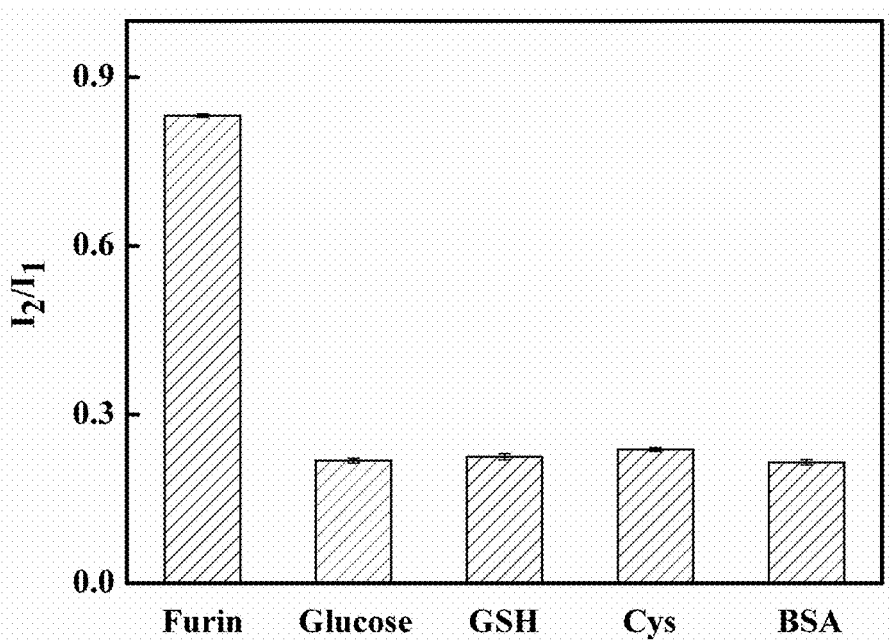
FIG. 14 shows fluorescence intensities of the HMSN/DOX/RVRR/PAMAM/TPE fluorescent probe in the presence of different substrates.

To test the selectivity of the method on Furin, a change of fluorescence signal was evaluated after reaction with different substrates. As shown in FIG. 14, treatment was conducted with Furin, GSH, Cys, BSA and glucose separately. It was found that the $I_2/I_1$ fluorescence signal of Furin treatment was significantly higher than that of other substances. This was because Furin could induce the cleavage of RVRR peptide, leading to the release of DOX molecule to form a FRET pair with TPE, such that the fluorescence signal $I_1$ of TPE gradually decreased, while the fluorescence signal $I_2$ of DOX increased accordingly. Therefore, the method had a satisfactory selectivity.

Figure 15:
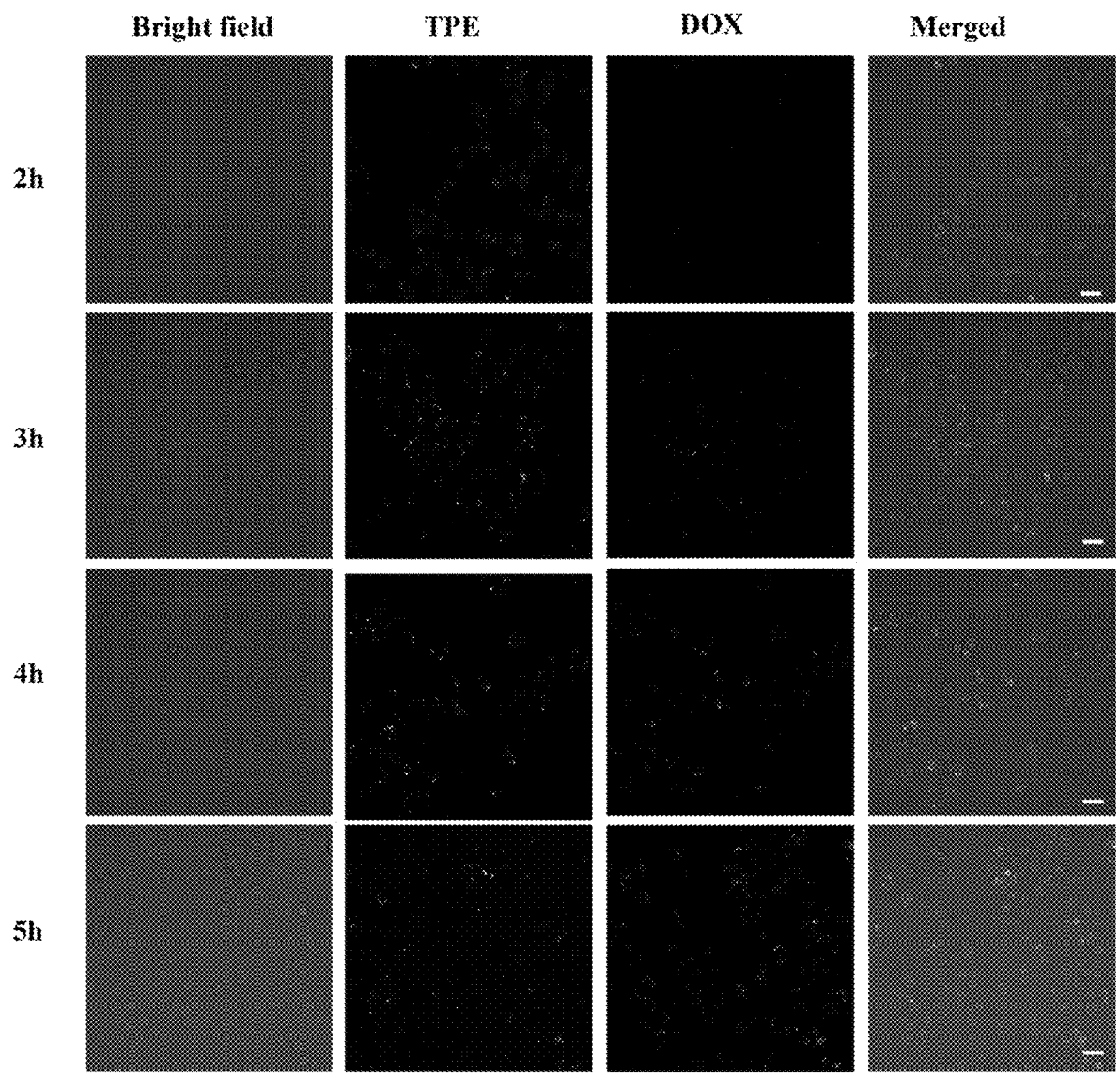
FIG. 15 shows CLSM images of MDA-MB-468 cells incubated with the HMSN/DOX/RVRR/PAMAM/TPE at a dosage of 10 μg/mL for different times, where the scale bar is 20 m.
Figure 16:
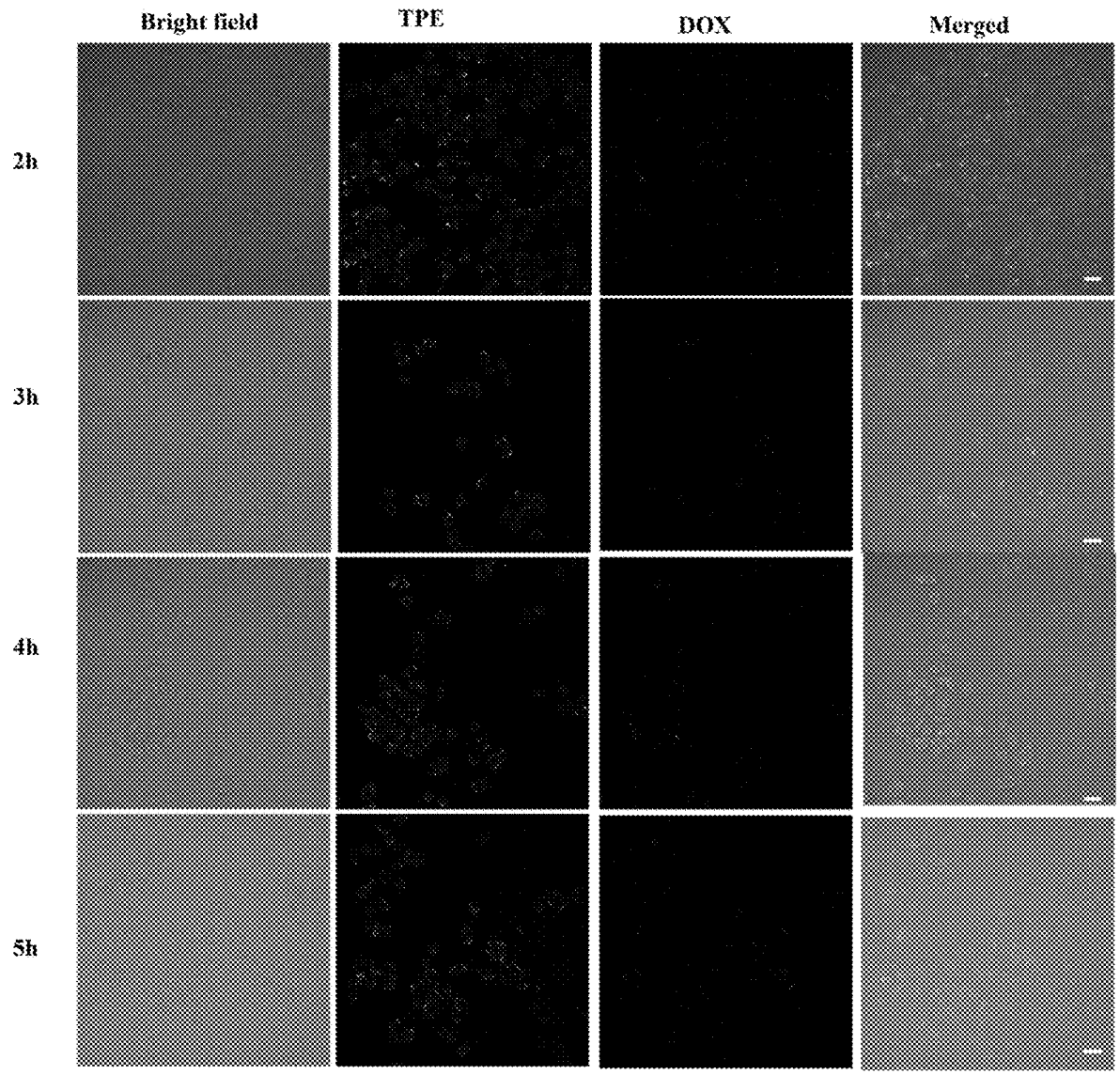
FIG. 16 shows CLSM images of MDA-MB-468 cells pretreated with a 0.05 mM Furin protease inhibitor I incubated with the HMSN/DOX/RVRR/PAMAM/TPE at a dosage of 10 g/mL for different times, where the scale bar is 20 m.

2.3. Cellular Internalization Ability of Materials and Intracellular Fluorescence Detection In view of excellent extracellular detection properties on Furin, the HMSN/DOX/RVRR/PAMAM/TPE was used for the change of FRET fluorescence signal generated in Furin-induced TPE/DOX in living cells. This could visually reflect the release of drug, while enabling the analysis of Furin in cells. To achieve autologous supply of Furin, Furin-overexpressing breast cancer cells MDA-MB-468 cells were selected as a research object. The MDA-MB-468 cells were incubated with 10 μg mL$^{-1}$ of HMSN/DOX/RVRR/PAMAM/TPE at 37° C. for various times for cell imaging. As shown in FIG. 15, when the cells were incubated with the HMSN/DOX/RVRR/PAMAM/TPE fluorescent probe for 2 h, blue and green fluorescences were directly observed, indicating that the HMSN/DOX/RVRR/PAMAM/TPE fluorescent probe could achieve cellular internalization within about 2 h, which was mainly concentrated in the cytoplasm. At this time, the DOX had extremely weak fluorescences that were even in a closed state, indicating that the DOX molecule was mainly coated in a core of the nanoparticle. With the extinction of incubation time, the fluorescence imaging of MDA-MB-468 cells incubated with HMSN/DOX/RVRR/PAMAM/TPE showed gradually-weakened TPE blue fluorescence and gradually-enhanced DOX green fluorescence, which were consistent with a change trend of extracellular FRET fluorescence signals. In addition, as shown in FIG. 16, in MDA-MB-468 cells pre-incubated with a 0.05 mM Furin protease inhibitor I, only the blue fluorescence of TPE was observed, while no obvious green fluorescence was produced. These results further confirmed that Furin overexpressed in MDA-MB-468 cells responded to specific polypeptide chains in HMSN/DOX/RVRR/PAMAM/TPE, to achieve specific cleavage, thereby promoting the release of DOX. In view of the closely-arranged PAMAM/TPE outside HMSN, the released DOX could be inserted into the interior of PAMAM, thereby reducing a molecular distance of the TPE/DOX to realize a process of intracellular FRET effect from scratch. Therefore, a specific analysis of intracellular Furin was conducted through the generation of intracellular FRET fluorescent signals.

3. CONCLUSION

In summary, the present disclosure provides a composite nanosystem capable of conducting FRET effect in cells, and realizes the FRET from scratch in cells. On the one hand, under the action of Furin, the RVRR peptide in the HMSN/DOX/RVRR/PAMAM/TPE probe is specifically recognized and cleaved, DOX is released, and a FRET complex of TPE/DOX is formed, thereby generating the FRET fluorescence signals. The generated fluorescence signals are applied to the quantitative detection of Furin in tumor cells. On the other hand, as the FRET fluorescence signals are generated, the precise release of DOX in tumor cells is completed, thereby reducing damages to the normal cells.

Although the above examples have described the present disclosure in details, it is only some but not all examples of the present disclosure, and other examples can be obtained without inventive step according to the present examples, all of which fall within the claimed scope of the present disclosure.

What is claimed is:

1. A fluorescence resonance energy transfer (FRET) nanoprobe, comprising a loading component and an encapsulating component that encapsulates the loading component, wherein the loading component comprises a carrier and DOX coated in the carrier, and the carrier is a carboxyl-modified hollow mesoporous silica nanoparticle (HMSN); and the encapsulating component comprises an RVRR peptide and PAMAM/TPE.

2. The FRET nanoprobe according to claim 1, wherein the carboxyl-modified HMSN and the DOX have a mass ratio of (1-2):(1-2).

3. A method for preparing the FRET nanoprobe according to claim 1, comprising the following steps:
  1) Mixing a carboxyl-modified HMSN solution and a DOX solution to obtain an HMSN/DOX solution; and
  2) mixing the HMSN/DOX solution, the RVRR peptide, and the PAMAM/TPE to obtain the FRET nanoprobe.

4. The method according to claim 3, wherein in step 1) and step 2), the mixing is conducted independently at 20° C. to 30° C. for 20 h to 24 h in the dark.

5. The method according to claim 3, wherein the carboxyl-modified HMSN and the DOX have a mass ratio of (1-2):(1-2).

* * * * *